United States Patent
Yao et al.

(10) Patent No.: US 11,825,354 B2
(45) Date of Patent: Nov. 21, 2023

(54) CUSTOMER SPECIFIC NETWORK SLICING

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 189 days.

(21) Appl. No.: 17/394,163

(22) Filed: Aug. 4, 2021

(65) Prior Publication Data

US 2023/0041375 A1 Feb. 9, 2023

(51) Int. Cl.
*H04W 4/00* (2018.01)
*H04W 28/20* (2009.01)
*H04W 28/24* (2009.01)
*H04W 28/02* (2009.01)

(52) U.S. Cl.
CPC ....... *H04W 28/20* (2013.01); *H04W 28/0268* (2013.01); *H04W 28/24* (2013.01)

(58) Field of Classification Search
CPC .............................. H04W 28/20; H04W 28/24
See application file for complete search history.

(56) References Cited

U.S. PATENT DOCUMENTS

| | | | | |
|---|---|---|---|---|
| 10,992,638 B1* | 4/2021 | Varan | .................... | H04L 61/106 |
| 2012/0233302 A1* | 9/2012 | Kallin | .................... | H04L 47/72 |
| | | | | 709/221 |
| 2016/0352734 A1* | 12/2016 | Senarath | ................. | H04L 63/10 |
| 2018/0324663 A1* | 11/2018 | Park | ...................... | H04W 36/22 |
| 2019/0034102 A1* | 1/2019 | Miller | .................... | G06F 12/14 |
| 2019/0327153 A1* | 10/2019 | Wahlqvist | ............. | H04L 41/342 |

(Continued)

OTHER PUBLICATIONS

"Management and Orchestration; Concept, use cases and requirements", "3GPP Reference Specification 28-530", Dec. 31, 2017, No. 15, Publisher: downloaded from Internet on Jul. 14, 2021 from https://portal.3gpp.org/desktopmodules/Specifications/SpecificationDetails.aspx?specificationId=3273.

(Continued)

*Primary Examiner* — Chi H Pham
*Assistant Examiner* — Elisabeth Benoit Magloire
(74) *Attorney, Agent, or Firm* — Wash Park IP Ltd.; John T Kennedy

(57) ABSTRACT

Systems, devices and methods, for customer specific network slicing include a virtual network operator ("VNO") server, a first node, and a virtualized network. The VNO server instantiates a solution manager engine which identifies a Solution, communicates the Solution to the first node, and upon acceptance of the Solution by the first node, instructs the virtualized network to couple the first node with a second node in accordance with the Solution. The virtualized network may include network function virtualization infrastructure and the Solution may include a slice of the virtualized network. The slice satisfies a Service Level Requirement (SLR), such as one that specifies a maximum latency for the slice. The SLR is specified in a Need received by the VNO server from the first node. The SLR is determined based upon an application program the first Node is at least one of currently executing and expected to later execute.

19 Claims, 4 Drawing Sheets

(56) References Cited

U.S. PATENT DOCUMENTS

| | | | | |
|---|---|---|---|---|
| 2019/0372853 | A1* | 12/2019 | Bainbridge | H04L 49/354 |
| 2021/0204207 | A1* | 7/2021 | Fiorese | H04W 12/08 |
| 2021/0368514 | A1* | 11/2021 | Xing | H04W 24/02 |
| 2021/0409524 | A1* | 12/2021 | Uscumlic | G06N 7/01 |
| 2022/0022044 | A1* | 1/2022 | D'Oro | H04W 4/021 |
| 2022/0046528 | A1* | 2/2022 | Yang | H04W 72/046 |
| 2022/0264540 | A1* | 8/2022 | Panchal | H04W 72/04 |
| 2022/0272620 | A1* | 8/2022 | Ninglekhu | H04W 88/02 |
| 2022/0398131 | A1* | 12/2022 | Rakshit | G06F 9/45533 |
| 2022/0417948 | A1* | 12/2022 | Balasingam | H04W 72/0446 |

OTHER PUBLICATIONS

"CISCO Network Services Orchestrator Overview", Publisher: CISCO, downloaded from the Internet on Jul. 6, 2021 from https://www.cisco.com/c/dam/en/us/solutions/service-provider/solutions-cloud-providers/network-services-orchestrator-solutions/pdf/nso-solution-overview.pdf.

"How DISH Network is Revolutionizing 5G Service Delivery", Publisher: IBM, downloaded from the Internet on Jul. 13, 2021 from https://www.IBM.com/cloud/blog/how-dish-network-is-revolutionizing-5g-service-delivery.

* cited by examiner

CUSTOMER SPECIFIC NETWORK SLICING

TECHNICAL FIELD

The technology described herein generally relates to devices, systems, and processes for facilitating customer specific networking slicing.

BACKGROUND

Various devices, systems and processes today enable network providers to multiplex numerous virtualized and independent logical networks onto a given physical network infrastructure. Such multiplexing is commonly referred to as "network slicing." For a virtualized network, each "slice" is commonly a virtually isolated end-to-end network, operating over various physical infrastructure components which couple two or more nodes (or other end points of a network) together. As used herein, a "node" can be any device, and/or applications, such as distributed applications, virtualized applications and the like, that are executed, in whole or in part by a device, connected, directly or indirectly, such as by a local area network (LAN), to a network. A slice is commonly tailored to fulfill various networking, communications, data storage, data processing and other requirements, as requested by a particular node or nodes. Different requirements for different slices may require use of different logical and physical infrastructure components. Each slice commonly has associated with it a service level requirement (SLR). An SLR may be pre-determined or specified in-advance and with respect to a given use and/or user of a given slice. The SLR influences physical infrastructure components utilized, how the virtualization of a given logical network occurs in the actual physical domain, and the like. To facilitate slicing various well-known concepts are commonly used, such as software defined networks (SDNs), and network function virtualization (NFV). SDNs and NFVs facilitate scalable, flexible networks that operate using a common network infrastructure. Virtualized networks, and slices provided to users therewith, are commonly dynamic in that they may use at any given time any selection of and/or combination of physical infrastructure components needed to satisfy a given SLR.

Typically, network slices are managed and operated by a virtual network operator (VNO), as used herein a VNO can be a mobile network operator and/or a mobile virtual network operator, or the like. The VNO commonly contracts with one or more physical network infrastructure providers. The physical infrastructure provider(s) may provide, for example, data servers, communications switches, communications backbone elements such as radio frequency, fiber optic, wired and other forms of communications links, data hubs, and the like. Since physical infrastructure components uses, availabilities, capabilities, and the like vary over time, a VNO commonly uses a logical component often referred to as an "orchestrator" to manage the physical infrastructure components utilized, at a given time, by any given slice.

Today, network slicing is commonly provided today between VNOs and specific enterprise customers and with regards to a particular program, given SLRs, and often on a predetermined and/or static basis. While such provisioning may satisfy predictable and commonly occurring needs for the given enterprise customer, mechanisms are needed for providing network slicing in view of dynamic SLR needs and/or in view of dynamic, ad hoc users, such as small business, individual users, applications, or the like.

Further, network slicing today often results in inefficient allocations of scare network resources. Being provided on a pre-determined, often static basis to given enterprise customers, such pre-allocated network slices often do not fully utilize the potential of one or more logical and/or underlying physical infrastructure components. Often, the non-use, inefficient use, or limited use of one or more slice capabilities may be undetermined, non-monitored, not realized, or otherwise under-utilized. Accordingly, network inefficiencies often occur and usage gaps of permissible slices commonly arise. Thus, a need also exists for identifying and allocating network slice usage gaps and for utilizing logical and physical network resources more efficiently.

The various embodiments of the present disclosure address these and other needs.

SUMMARY

Various implementations are described of devices, systems, and processes for facilitating customer specific network slicing."

In accordance with at least one implementation of the present disclosure, a system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. One general aspect includes a system that includes a VNO server; a first node; and a virtualized network. The VNO server executes first computer instructions instantiating a solution manager engine which: identifies a Solution; communicates the Solution to the first node; and upon acceptance of the Solution by the first node, instructs the virtualized network to couple the first node with a second node in accordance with the Solution. Other embodiments of this aspect include corresponding computer systems, apparatus, and computer programs recorded on one or more computer storage devices, each configured to perform the actions of the methods.

Implementations may include one or more of the following features. The virtualized network further may include network function virtualization infrastructure. The Solution may include a slice of the virtualized network. The Solution may provide the slice which satisfies a service level requirement (SLR). The SLR may specify a maximum latency for the slice. The SLR may be specified in a Need received by the VNO server from the first node. The SLR may be determined based upon an application program the first node is at least one of currently executing and expected to later execute. The application program may specify at least one of a data processing requirement and a data communication requirement. The application program may facilitate day trading. The application program may facilitate real-time sports betting. The VNO server may execute second computer instructions instantiating an artificial intelligence/machine learning (AIML) engine which: monitors the Solution; monitors the first node for a requested Need; and generates a future Solution to a future Need. The AIML engine may identify gaps in the virtualized network based upon at least one of the Solution, a past Solution, a future Solution, the requested Need, a past Need, and the future Need. The solution manager engine may identify a future Need based upon an application program the first node is at least one of currently executing and expected to later execute. Implementations of the described techniques may include hardware, a method or process, or computer software on a computer-accessible medium.

One general aspect includes a node. The node also includes a central processing unit (CPU); where the CPU executes computer instructions instantiating a need engine which: generates a Need; communicates the Need to a VNO server; receives a Solution to the Need from the VNO server; and communicates at least one of an acceptance, a rejection, and a revised Solution to the VNO server. Other embodiments of this aspect include corresponding computer systems, apparatus, and computer programs recorded on one or more computer storage devices, each configured to perform the actions of the methods.

Implementations may include one or more of the following features. The Need identifies at least one service level requirement (SLR) for a communicative coupling of the node with a second node over a virtualized network. The Solution identifies a slice of the virtualized network; and where the Solution identifies whether the SLR identified in the Need may be satisfied by the slice of the virtualized network. The SLR may include a bandwidth requirement. The bandwidth requirement may arise with respect to a telemedicine application. Implementations of the described techniques may include hardware, a method or process, or computer software on a computer-accessible medium.

One general aspect includes a method for allocating virtualized network resources. The method also includes receiving, at a VNO server and from a first node, a Need request; determining whether the Need request may be satisfied by a present Solution; if the need request may be satisfied by the present Solution, assigning the present Solution to the first node; and communicatively coupling the first node with at least one second node using a slice of a virtualized network specified by the present Solution. The method may also include, if the need request cannot be satisfied by the present solution, generating a new Solution. Other embodiments of this aspect include corresponding computer systems, apparatus, and computer programs recorded on one or more computer storage devices, each configured to perform the actions of the methods.

Implementations may include one or more of the following features. The Need request may identify a service level requirement (SLR). The present Solution satisfies the SLR. The new Solution identifies at least one alternative to the SLR. The SLR may specify at least one of a maximum latency, a bandwidth, a security requirement, and a routing requirement. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
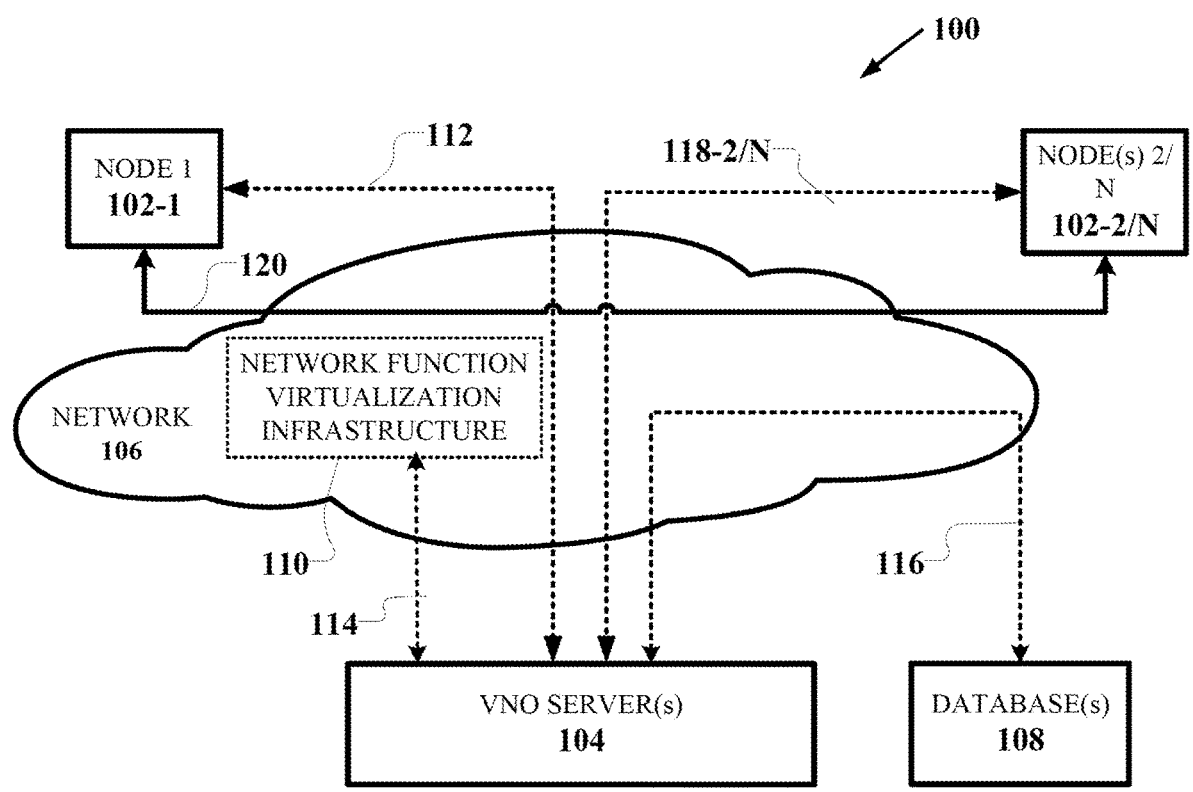
FIG. 1 is a schematic illustration of a system for facilitating customer specific network slicing and in accordance with at least one implementation of the present disclosure.

Various implementations of the present disclosure describe devices, systems, and processes for facilitating customer specific network slicing. As used herein, "customer specific network slicing" refers to the providing of one or more network slices, wherein each slice (or combination of slices) is tailored to satisfy a given node's ad hoc "communication needs."

As used herein, a "communication need" is one or more characteristics for a given, ad hoc use of one or more logical and/or physical network elements between a first node and at least one second node. The communication need may also identify a data processing, data storage, data rendering, or other data operation requirement (herein, individually and collectively, a "data need"). The communication need and/or data need (herein, the "Need") may be specified automatically (for example, by an application program having minimum SLR and other requirements), semi-automatically (for example, by a user selection of an option from a range of acceptable or available SLRs), or manually (for example, by a user individually specifying each of one or more SLRs for a given connection or set of connections).

A Need often arises on an ad hoc basis, in that a given one or more SLRs may be requested for a given set of data to be communicated, for a given data operation to be performed, for a given time-period, or otherwise. That is, unlike existing arrangements between enterprise customers and VNOs which establish continually available network connections satisfying pre-determined SLRs, a Need is temporary as the Need exists only as long as an amount of time necessary, per a given SLR, to communicate a given quantity of data, perform a data processing, storage and/or other data operation, or otherwise accomplish some data processing and/or communication action. The Need arises and exists when a first node has one or more SLRs that are to be satisfied for a given transaction or a series of transactions, where such transactions are not pre-planned or pre-determined.

A non-limiting example of a Need is a stock day trader who commonly maintains a connection between their computing device, a first node, and a broker's computing device, a second node. For normal transactions, non-specified SLRs may be acceptable—that is, the day trader's Needs may be described as being generic. However, when an urgent, or time sensitive trade is to be transacted, for example to complete a complex trade (or series thereof), the day trader may seek to acquire communications services that meet certain defined SLRs, such as the communications occur without exceeding a maximum network latency, using a certain bandwidth, having certain security characteristics, routing requirements such as avoiding foreign data servers, or otherwise.

Other non-limiting examples of Needs may include real-time online sports betting, telemedicine, banking transactions, cryptocurrency mining, and others. Any use of a communications network, a communications resources, a data processing resource, a remotely controlled device, system or process, or otherwise may be considered a Need.

A "Solution" is one or more fulfillments of a given Need. A Solution may be characterized as a satisfying of one or more SLRs in response to a given Need. A Solution may be associated with an identified VNO or multiple VNOs. A Solution may be uniquely provided by a given VNO, common to multiple VNOs, be an aggregate of solutions provided by multiple VNOs, or otherwise. A Solution may be identified on a selectable listing, formed based upon a selection of one or more SLR requirements from a menu or other ordering system, or otherwise identified and selected by a user. A Solution may be allocated on a first come, first-to-purchase, auction, bidding, or other process. A Solution may be associated with a static pricing model where a specified SLR is equated with a given pricing structure, model, or the like. Improvements or degradations in one or more SLRs may result in a modification of the given pricing structure. A Solution may be associated with a dynamic pricing model where pricing of a given Solution may dynamically vary based upon each SLR selected, then arising network characteristics, anticipated network characteristics, and otherwise. For example, a day trader requesting certain SLRs when a market has a high trading volume may result in a dynamically adjusted price for a given SLR that is higher than when the stock market is slow-moving or has a reduced trading volume.

A Solution may be configured to satisfy one or more SLRs based upon historical customer uses, then arising customer specific uses, dynamically, or otherwise. Artificial Intelligence processes and machine learning technologies (herein, individually and collectively "AIML") may be used to identify Solutions, the SLRs fulfilled by the Solution, the pricing of the Solution, and/or other use terms associated therewith. For example, AI may be used to determine Needs commonly desired and Solutions available by online gamblers during certain sporting events, such as professional American football games. Such AI processes may be configured to package Solutions, for manual, semi-automatic and/or automatic selection and use by gamblers, via gambling applications, websites, or the like.

As used herein, a reference to "Cloud" includes references to cloud computing, cloud storage, cloud communications, and/or other technology resources which a user may not actively manage the providing or use of such resources. A use of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide one or more Solutions.

"Substantially simultaneous" means without incurring a perceptible delay between a first event or condition, such as a submission of a trade request, and a second event or condition, such as an execution of such trade request by a broker's computing systems. It is to be appreciated that substantial simultaneity will vary based upon the characteristics of the sending and receiving nodes. For example, an action is substantially simultaneous with respect to node associated with a human user when an imperceptible human delay occurs. By another example, an action is substantial simultaneous with respect to a node associated with an automated or machine process, such as a computing process, when an action is performed without a delay greater than as required to meet a given SLR.

"Separate" means a first node may be physically or virtually separated from one or more second nodes. Such separation may occur geographically, wherein a first node is in a different room, building, city, state, or country than one or more second nodes. The separation may occur virtually by use of distinct logical networks, distinct physical networks, or otherwise.

"Content" refers to any information that may be presented, using a suitable presentation device, to a user in a humanly perceptible format. Non-limiting examples of content, include video, television programs, audio programs, speeches, concerts, gaming, or otherwise. Content may originate from any source, including live, augmented reality, virtual reality, computer generated, or otherwise. Content may be presented to a given user, at a node, using any "user device" (as described below). Content may be presented to one or more users real-time or otherwise. Content may be stored, transmitted, processed or otherwise manipulated in non-humanly perceptible formats that may be converted, by known and later arising devices, systems and methods, into humanly perceptible information presented by a suitable presentation device. Current embodiments of such presentation devices are well known any suitable known or later arising presentation device may be used for content presentation to users.

As shown in FIG. 1, one implementation of a system 100 for facilitating customer specific network slicing includes two or more nodes, such as a first node 102-1 and an Nth node 102-N. As used herein, a "node" 102 is any device configurable to communicate data using a network, directly or indirectly, to another node. A node 102 may be a stand-alone device, such as a human user's laptop computer, personal computer, smartphone, gaming device, or the like. A node 102 may be a thread operating on a computing system having a multiple threaded operating system, such as the WINDOWS 10 operating system, LINUX, APPLE OS, ANDROID, and others. A node 102 may be an application program executing on a computing device, a web service, or otherwise. An Application Program Interface (API) may be used by a node 102 to support an implementation of the present application. A node 102 may occur in the virtual domain and/or in the physical domain. A node 102 may be associated with a human user, a machine process executing on one or more computing devices, an API, a web service, instantiated on the Cloud, distributed across multiple computing devices, or otherwise.

As shown in FIG. 1, the system 100 includes at least two nodes 102-1 and 102-N configured to communicate data there between. For other implementations, any number of nodes may be used and Needs and Solutions expressed and fulfilled, respectively, there between. Further, it is to be appreciated that the Needs and Solutions may be bi-directional, uni-directional, or otherwise. For example, a day trader seeking to communicate an urgent trade request to the broker's system may have a Need for SLRs with as little latency as is physically possible (considering the speed of light, distance, and other physical limitations). A return communication by the broker confirming the trade may not require the same level of SLRs. Accordingly, Needs and Solutions may be requested and fulfilled based upon types of communications needed, data processing urgency required, nature of requester, and otherwise.

The system 100 includes a VNO server 104. The server 104 is communicatively coupled, by a server link 114 to a network 106, including network function virtualization infrastructure 110, and by respective first node link 112 and second to nth node links 118-2/N, to the various nodes 102-1/N. The node links 112 and 118-2/N may be transient links, existing only as necessary to establish, maintain, monitor, deconstruct, or otherwise one or more links satisfying one or more Needs and in accordance with one or more SLRs. The server 104 may also be communicatively coupled by a database link 116 to a database 108. The links 112-118 may utilize any form of communications architecture, protocols, topologies, technologies, or otherwise. The nodes 120 may be further coupled to each other for the exchange of data therebetween. The links 112-120 may utilize the Cloud, be direct links, use one or more networks, or otherwise.

The network 106 includes physical data processing and communication components. Network function virtualization infrastructure 110 facilitates adaption, control and other operations of physical network components. Non-limiting examples of physical network components include data processing and communications components including computer servers, blade servers, switches, routers, encryption/decryption and other data security components, data storage and warehousing components, communication links such as those provided by wired connections, wireless connections including micro-wave, 3G/4G/5G, WIFI, and other types, satellite connections, fiber optic connections, and other components. Any known or later arising physical data processing and/or communications components may be utilized.

As is well known, physical data processing and communications components may be logically defined, organized and utilized as a network function virtualization infrastructure 110. The virtualization of data processing and communications component infrastructures is well known in the art and any known or later arising topologies, approaches, methods, protocols, or the like for such virtualization may be utilized.

For at least one implementation, the network function virtualization infrastructure 110 may include commonly known components such as orchestrators, network function virtualization managers, virtualization infrastructure managers, and other components. The virtualization infrastructure 110 facilitates the providing of Solutions to nodes 102 by configuring one or more physical network resources to provide slices and other physical elements that satisfy one or more Needs. The network function virtualization infrastructure 110 may be configured to utilize any known and/or later arising network virtualization components. Other network function virtualization infrastructure 110 applications, components, APIs, and otherwise may be used in a given implementation of the present disclosure.

VNO Server 104

Figure 2:
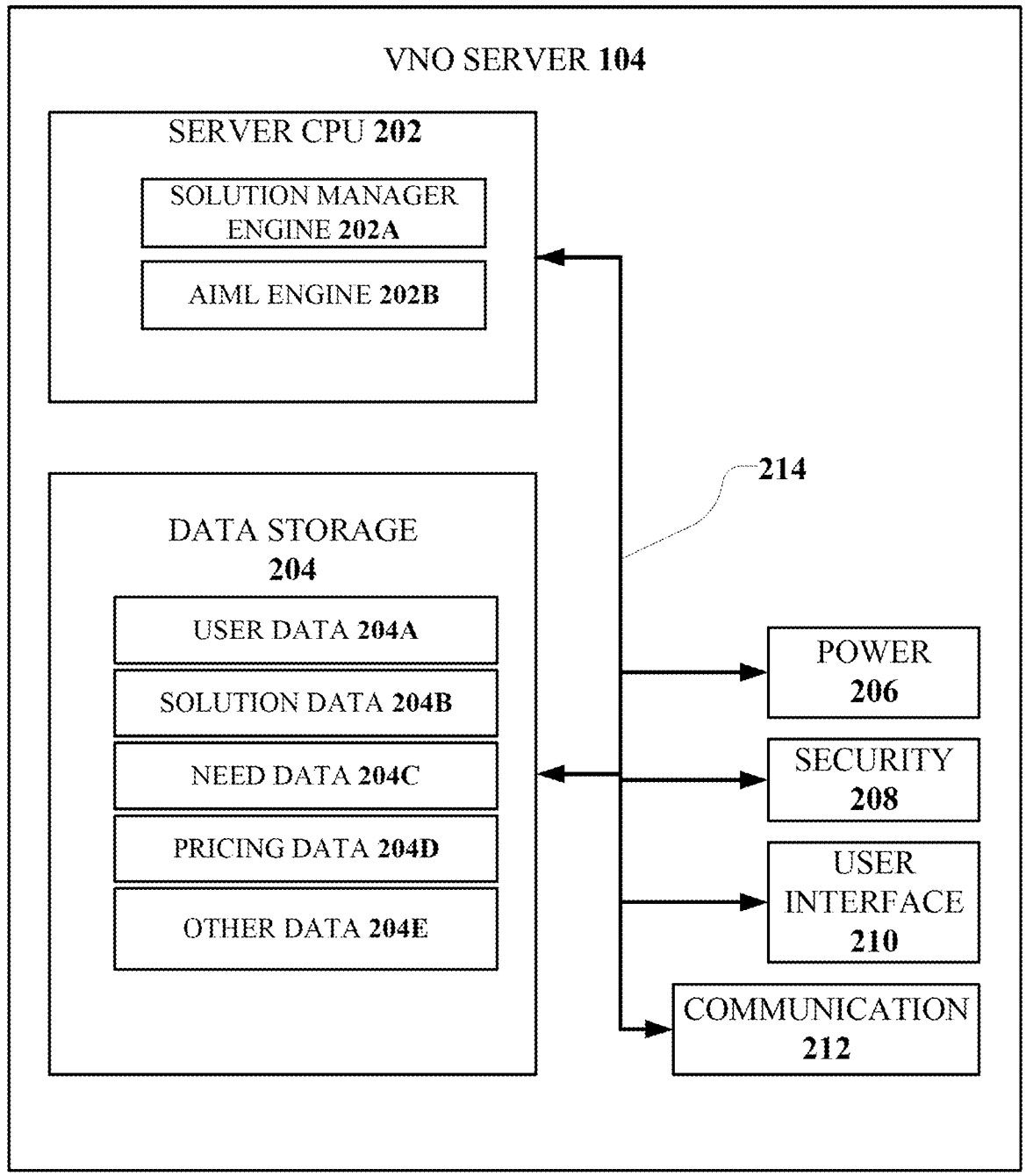
FIG. 2 illustrates a server configured for use in facilitating customer specific network slicing and in accordance with at least one implementation of the present disclosure.

As shown in FIGS. 1 and 2, the VNO server 104 may include and/or be communicatively coupled to a server central processing unit (CPU) 202. The server CPU 202 may be provided by any processing device capable of executing one more computer executable instructions (herein, a "computer instruction") which, in accordance with an implementation of the present disclosure, facilitates one or more data processing operations including, and not limited to, one or more computer engines such as a Solution manager engine 202A, and an AIML engine 202B (such computer engines are further described below). One or more of the computer engines 202-AB may be combined, included, not included, distributed across one or more devices, such as being provided in whole or in part by one or more nodes 104, network components 106, or otherwise.

The server CPU 202 may include one or more physical and/or logical components configured for such data processing operations. The server CPU 202 may include one or more hardware processors, such as 32-bit and 64-bit central processing units, multi-core ARM based processors, microprocessors, microcontrollers, and otherwise. The processors may be physically and/or virtually instantiated. The processors provided by the server CPU 202 may be localized, distributed, Cloud based, or otherwise provided. The computer instructions may include instructions for executing one or more application programs, APIs, software computer engines, and/or other processes configured to perform computer executable operations (herein, "engines"). Such engines may arise in any computing configuration including, and not limited to, local, remote, distributed, blade, virtual, or other configurations and/or systems configured for use in support of an implementation of one or more embodiments of the present disclosure.

Solution Manager Engine 202A

The VNO server 104 may execute a Solution manager engine 202A. The Solution manager engine 202A facilitates management of Solutions. The Solution manager engine 202A may be configured to manage presentation of Solutions to a node 102 and the acquisition of usage rights to a Solution selected by a node 102. Using user data 304A, the Solution manager engine 202A may identify Solutions that are pre-configured to satisfy a user Need. For example, user data 304A may identify an application a node 102 is currently executing, data processing and/or data communication requirements for such application, any user preferences for prioritization of data requirements based on an executing application, user bidding preferences associated with a node's acquiring of rights in a Solution, and otherwise. Based on such user data 304A, the Solution manager engine 202A may identify one or more Solutions to a given node for a then existing Need and/or for a future arising Need. Such Solution(s) may specify one or more SLRs satisfied by the Solution, identify one or more slices supported by the Solution, identify any upgrades/downgrades in SLRs that may be available and provide other options for a node 102 to customize a Solution.

Figure 4:
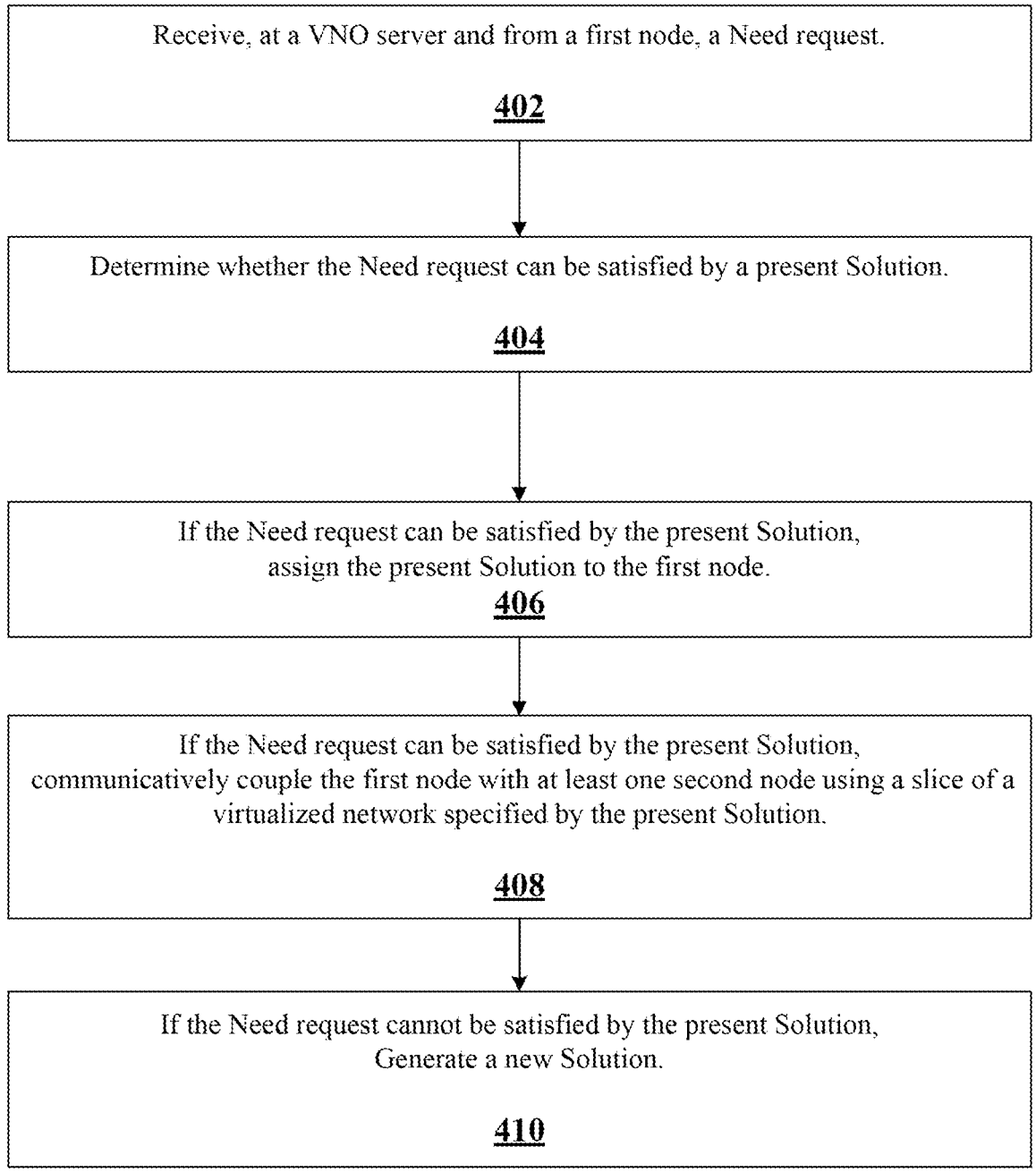
FIG. 4 illustrate a method for use in facilitating customer specific network slicing and in accordance with at least one implementation of the present disclosure.

As shown in FIG. 4 and for at least one implementation, the Solution manager engine 202A may be configured to: receive a Need request from a node 102 (Operation 402); determine whether the Need can be satisfied by a present Solution (Operation 404); if so, assign the Solution to the node 102 for use thereby at the relevant time (Operation 406); at the relevant time, communicatively couple the first node with the second node using a slice of the virtualized network specified by the present Solution (Operation 408); and if a presently identified Solution is not available and/or capable of satisfying the Need, the Solution manager engine 202A may be configured to generate a new Solution (Operation 410).

For at least one implementation the new Solution may satisfy one or more SLRs. Such SLRs may be specified by the given Need and/or determined by the Solution manager engine 202A in response to the given actual and/or anticipated Need. As discussed above, the Solution may satisfy a communication need, a data need, both a communication need and a data need, and/or other forms of Needs.

For at least one implementation, the Solution manager engine 202A may communicate one or more Solutions to a node 102. The Solution(s) may be communicated in a node processable format, such as in a data format which a node 102 is configured to receive, process and act upon. The Solution may be communicated in a secure format, such that information identifying protocols, security keys, links to be utilized, and/or other information identifying a slice and/or a characteristic of a Solution may be accessible only by the intended Node(s).

For at least one implementation, the Solution manager engine 202A may be configured to communicate a Solution to node 102, such that the node 102 can process the data provided by the Solution and present one or more Solutions to a user in a humanly perceptible format. For example, a node 102 may be configured to present received Solutions in a graphical, tabular, or other data format where multiple Solution options may be presented and selected by a user, using a corresponding user input device. For another example, a node 102 may be configured to present received Solutions in a ranked order, price ordered, timeliness orders, SLR ordered, or any other format to facilitate user contemplation of the Solutions provided and selection of one more Solutions by the user.

For at least one implementation, the Solution manager engine 202A may be configured to predict future Needs for a given node 102 based upon user preferences, user demographic information, user psychographic information, historical node Needs, and other data. Such data may be provided to and/or otherwise acquired by the VNO server 104 and stored as user data 204A and/or Solution data 204B. For an implementation, Solution data 204B may include data identifying past Solutions accepted by a given node 102, Needs which the Solution fulfilled, application(s) used with the Solution, and other information pertinent to the generation, presentation, management, and accounting for Solutions in view of one or more Needs.

For an implementation, the Solution manager engine 202A may be configured to facilitate a reservation system whereby a given node 102 identifies to the VNO server 104 a future Need and reserves a future Solution for such future Need. For example, a user of a node 102 that is planning on participating in real-time sports betting for a future occurring sporting event may desire to reserve in advance, and for a limited time/specific event purpose, one or more Solutions at and/or about the time of the sporting event.

The Solutions manager engine 202A may be configured to cooperate with other engines provided by the VNO server 104 including, but not limited to, the AIML engine 202B.

The Solutions manager 202A may be configured to use: Solution data 204B, which identifies one or more Solutions; Need data 204C, which identifies one or past, present or future Needs identified by one or more nodes 102; pricing data 204D, which identifies pricing options for one or more Solutions, where such pricing may be provided on an SLR basis, a slice basis, or otherwise; and any other data 204E in generating, providing, tracking, monitoring, or otherwise facilitating Solutions to Needs.

For at least one implementation the Solution manager engine 202A may be configured to include APIs configured for use with one or more network function virtualization infrastructure 110 components, applications, or otherwise.

AIML Engine 202B

The VNO server 104 may execute an AIML engine 202B. The AIML engine 202B monitors past and currently occurring Needs and Solutions and generates future Solutions for anticipated future Needs.

For at least one implementation, the AIML engine 202B may be configured to identify gaps in the network 106, where a network gap is an absence of a Solution to a given Need. For example, a network 106 may not be configurable to offer a Solution satisfying one or more SLRs for a given Need. The AIML engine 202B may be configured to identify such gap and recommend suggestions to alleviating such gap by one or more Solutions and/or by adjusting one or more SLRs to provide a Solution that is more responsive to a given current or anticipated future Need. For example, the sporting event referenced above may be expected to generate significant interest by multiple nodes in Solutions satisfying certain SLRs. The AIML engine 202B may be configured to recognize that given the SLRs typically specified, the network 106 may be capable of providing Solutions satisfying such SLRs to only a limited number of nodes 102. However, the AIML engine 202B may be configured to recognize that a second Solution satisfying a second set of SLRs may be provided to a larger selection of nodes 102 and thereby addressing the Needs of the larger selection of nodes 102 but with a limited, if any impact upon the actual performance of a communication need, and/or a data need as addressed by the second Solution.

Server Data Storage 204

The server CPU 202 may be communicatively coupled by a server data bus 214, or similar structure, to a server data storage 204, which may also be referred to as a "computer readable storage medium." The server data storage 204 may be a single storage device, multiple storage devices, or otherwise. The server data storage 204 may be provided locally with the VNO server 104 or remotely, such as a data storage service provided on the Cloud, by the database 108, and/or otherwise. Storage of data including, and not limited to, user data 204A, Solution data 204B, Need data 204C, pricing data 204D, and other data 204E may be managed by a storage controller (not shown) or similar component.

It is to be appreciated that a storage controller manages the storing of data and may be instantiated in one or more of the server data storage 204, the server CPU 202, on the Cloud, on the database 108, or otherwise. Any known or later arising storage technologies may be utilized. Non-limiting examples of devices that may be configured for use as server data storage 204 include electrical storage devices, such as EEPROMs, random access memory (RAM), Flash drives, and solid-state drives, optical drives such as DVDs and CDs, magnetic storage devices, such as hard drive discs, magnetic drives, magnetic tapes, memory cards, such as Compact Flash (CF), Secure Digital (SD) cards, Universal Serial Bus (USB) cards, and others.

Available storage provided by the server data storage 204 may be partitioned or otherwise designated by the storage controller, or otherwise, as providing for permanent storage and temporary storage. Non-transient data, transient data, computer instructions, or the like may be suitably stored in the server data storage 204 for any amount of time used to execute one or more computer instructions. While being used for execution of a computer instruction, such data is herein considered to be non-transient. While stored by the storage device, data is herein considered to be non-transient. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions and other data.

The VNO server 104 may be any computing device capable of facilitating one or more of the operations described herein and/or otherwise provided by an implementation of the present disclosure.

Server Power Supply 206

The VNO server 104 may be configured to include a server power supply 206. The server power supply 206 may include any known or later arising technologies which facilitate the storage, supplying, transforming, or other use of electrical energy. Non-limiting examples of such technologies include batteries, power converters, inductive charging components, transformers, line-power components, solar power components, and otherwise.

Server Security 208

The VNO server 104 may be further configured to include a server security component 208. The server security component 208 may be provided as a hardware security component, a software executed security component, and/or a combination thereof. Security components are well known in the art and may include any known or later arising security hardware and/or software components, including computer instructions, or combinations thereof, that are configured to secure content, communications, restrict access to devices, processes, components, and data therewith, and otherwise. The server security component 208 may be used to facilitate secure transmission, processing, storage, and otherwise of any data used in accordance with an implementation of the present disclosure.

Server User Interface 210

The VNO server 104 may be further configured to include a server user interface 210. The server user interface 210 may include any known or later arising human to device interface components, processes and technologies. User interfaces are well-known in the art and non-limiting examples include interfaces facilitating human to device communication of information in any form including include audible inputs (such as spoken commands) and outputs (generated sound), visible inputs (such as eye tracking and facial recognition) and outputs (such as visible images presented on a display device, LEDs, or otherwise), touch inputs (such as on a trackpad, touch screen or otherwise), touch feedback (such as vibrations or other movements), gesture tracking, and otherwise. The server user interface 210 may be coupled to and/or include the one or more presentation devices (not shown). The presentation devices facilitate interactions between a user thereof and the VNO server 104. Non-limiting examples of presentation devices include speakers, displays, and others.

Server Communications Interface 212

The VNO server 104 may be further configured to include server communications interfaces 212. The server communications interfaces 212 may be configured to use any known or later arising communications and/or networking technologies which facilitate use of the network 106 (as further described below). Communication interfaces are well-known in the art and non-limiting examples include Ethernet cards, USB and storage medium interface cards, radio frequency transceivers, and others.

Nodes 102

Figure 3:
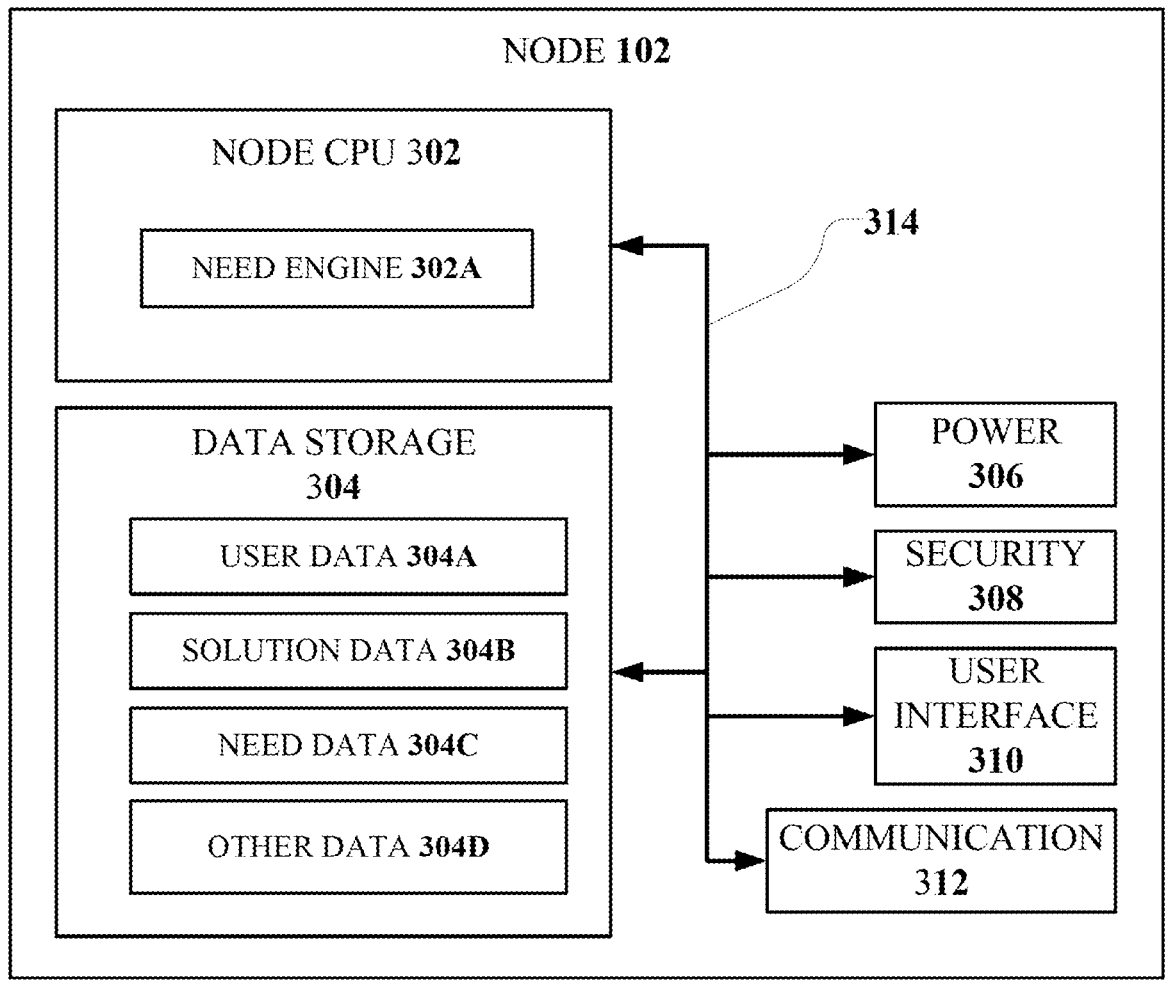
FIG. 3 illustrates a node configured for use in facilitating customer specific network slicing and in accordance with at least one implementation of the present disclosure.

Referring again to FIG. 1 and as shown in FIG. 3, for at least one implementation of customer specific network slicing, the system 100 includes at least a first node 102-1 communicating with a second node, such as the Nth node 102-N. The system includes one or more additional nodes.

The nodes 102 may be similarly configured to the VNO server 104 to include one or more processors, data storage, user interface, power supplies, security, and communications interface components. Non-limiting examples of nodes 102 include smartphones, laptop computers, tablet computing devices, desktop computers, smart televisions, smart glasses, virtual reality glasses, augmented reality glasses, earbuds/headphones and other audible output devices, application programs, web servers, and other devices.

Node CPU 302

More specifically, and as shown in FIG. 3, the nodes 102 may be include a node CPU 302. The node CPU 302 may be provided by any processing device capable of executing one more computer instructions which, in accordance with an implementation of the present disclosure, facilitates one or more data processing operations including, and not limited to, one or more computer engines such as a slice engine 302A, and an application engine 302B (such computer engines are further described below). One or more of the computer engines 302-AB may be combined, included, not included, distributed across one or more devices, such as being provided in whole or in part by one or more nodes 104, network components 106, or otherwise.

The node CPU 302 may include one or more physical (as compared to logical) components configured for such data processing operations. The node CPU 302 may include one or more hardware processors, such as 32-bit and 64-bit central processing units, multi-core ARM based processors, microprocessors, microcontrollers, and otherwise. The processors provided by the node CPU 302 may be localized, distributed, Cloud based, or otherwise provided. The computer instructions may include one or more engines. Such engines may arise in any computing configuration including, and not limited to, local, remote, distributed, blade, virtual, or other configurations and/or systems configured for use in support of an implementation of one or more embodiments of the present disclosure.

For at least one implementation, the node CPU 302 may be configured to implement a Need engine 302A.

Need Engine 302A

A node 102 may execute a Need engine 302A. The Need engine 302A facilitates management of Needs and Solutions. The Need engine 302A may be configured to generate a Need, manage communication of a Need to the VNO server 104, receive Solutions from the VNO server 104, communicate acceptance of a Solution to the VNO server 104, and perform other operations pertaining to Need and Solutions.

For at least one implementation, the Need engine 302 may be configured to acquire, from a VNO server 104, usage rights to a Solution selected by a node 102. Such usage rights may be communicated by the node 102, and/or by the VNO server 104, to one or more of the network function virtualization infrastructure components 110 which facilitate use of the network 106 by the node 102.

For at least one implementation, the Need engine may be configured to utilize user data 304A, which may include indications of applications currently in use and/or likely to be in use at a later time, the Need engine 302A may identify present and/or future Needs. User data 304A may also include information indicating a user's preferences, such as pricing limits (min. and max.), security requirements, SLRs, application programs available, web services used, connectivity data, such as the nodes 102 connectivity to network infrastructure, such as web servers, switches and the like, processing capabilities of the node 102, and other user/node specific data.

For at least one implementation, user data 304A may identify an application a node 102 is currently executing, data requirements for such application, any user preferences for prioritization of data requirements based on an executing application, user bidding preferences associated with a node's acquiring of rights in a Solution, and otherwise. Based on such user data 304A, the Need engine 302A may identify one or more Solutions, as identified by a VNO server 104, or a then existing Need and/or for a future arising Need. Such Solution(s) may specify one or more SLRs satisfied by the Solution, identify one or more slices supported by the Solution, identify any upgrades/downgrades in SLRs that may be available and provide other options for a node 102 to customize a Solution.

The Need engine 302A may be configured to utilize Solution data 304B. The Solution data 304B may be populated based upon information received from a VNO server 104, based on past Solutions selected, modified, or rejected, and/or other information. The Need engine 302A may manage the presentation, selection, and monitoring of Solutions.

The Need engine 302A may be configured to utilize Need data 304C. The Need data 304C may identify SLRs based upon user preferences, application requirements, anticipated activities, such as real-time sports betting, day-trading, or the like, and/or based upon other information. Need data 304C may be used in preparing and transmitting a Need request to a VNO server when a pre-packaged Solution is not available or does not satisfy a current Need.

For at least one implementation, the Need engine 302A may be configured to receive a Need request from a user of the given node 102, determine whether the Need can be satisfied by a presently identified Solution, and if so, request assignment/reservation of the Solution, by the VNO server 104, to the node 102 for use thereby and at the relevant time. When a presently identified Solution is not available and/or capable of satisfying the Need, the Need engine 302A may be configured to communicate a Need request, which requests generation of a new Solution by a VNO server 104. The new Need request may identify one or more SLRs to be satisfied by a Solution. Such SLRs may be specified by the given Need and/or determined by a VNO server 104 in response to the given actual and/or anticipated Need. As discussed above, the Solution may satisfy a communication need, a data need, both a communication need and a data need, and/or other forms of Needs. A Need request may specify one or more of such communication needs, data needs, both, and other needs.

For at least one implementation, the Need engine 302A may be configured to receive and present one or more Solutions to a user of a node 102. The user may be a person, a machine process, an Artificial Intelligence entity, or any other entity capable of receiving and selecting a Solution. The Need engine 302A may be configured to automatically, semi-automatically, and/or manually select a Solution. The Solution(s) may be received in a node processable format, such as in a data format in which a node 102 is configured to receive, process and act upon. The Solution may be received in a secure format, such that information identifying protocols, security keys, links to be utilized, and/or other information identifying a slice and/or a characteristic of a Solution may be accessible only by the intended Node(s).

For at least one implementation, the Need engine 302A may be configured to receive a Solution, process the data provided by the Solution and present one or more Solutions to a user in a humanly perceptible format via the user interface 310 and one or more user interface devices, such as speakers, monitors, or otherwise. For example, a node 102 may be configured to present received Solutions in a graphical, tabular, or other data format where multiple Solution options may be presented and selected by a user, using a corresponding user input device. For another example, a node 102 may be configured to present received Solutions in a ranked order, price ordered, timeliness orders, SLR ordered, or any other format to facilitate user contemplation of the Solutions provided and selection of one more Solutions by the user.

For at least one implementation, the Need engine 302A may be configured to predict future Needs for a given node 102 based upon user preferences, user demographic information, user psychographic information, historical node Needs, as stored in the node data storage 304 as, for example, Need data 304C, and other data. Such data may be provided to and/or otherwise acquired by the node 102 and stored as user data 304A, Solution data 304B, and/or Need data 304C. For an implementation, Solution data 204B may include data identifying past Solutions accepted by a given node 102, Needs which the Solution fulfilled, application(s) used with the Solution, and other information pertinent to the generation, presentation, management, and accounting for Solutions in view of one or more Needs.

For an implementation, the Need engine 302A may be configured to facilitate a reservation system whereby a given node 102 identifies to the VNO server 104 a future Need and reserves a future Solution for such future Need. For example, a user of a node 102 that is planning on participating in real-time sports betting for a future occurring sporting event may desire to reserve in advance, and for a limited time/specific event purpose, one or more Solutions at and/or about the time of the sporting event.

The Need engine 202A may be configured to cooperate with other engines provided by the node. For at least one implementation the Need engine 302A may be configured to include APIs configured for use with one or more network function virtualization infrastructure 110 components, applications, or otherwise.

Node Data Storage 304

The node CPU 302 may be communicatively coupled, by a node data bus 314 or similar structure, to a node data storage 304, which may also be referred to as a "computer readable storage medium." The node data storage 304 may be a single storage device, multiple storage devices, or otherwise. The node data storage 304 may be provided locally with a given node 102 or remotely, such as a data storage service provided on the Cloud, by the database 108, and/or otherwise. Storage of data including, and not limited to, user data 304A, Solution data 304B, Need data 304C, and other data 304D may be managed by a storage controller (not shown) or similar component.

It is to be appreciated that a storage controller manages the storing of data and may be instantiated in one or more of the node data storage 304, the node CPU 302, on the Cloud, on the database 108, or otherwise. Any known or later arising storage technologies may be utilized. Non-limiting examples of devices that may be configured for use as node data storage 304 include electrical storage devices, such as EEPROMs, random access memory (RAM), Flash drives, and solid-state drives, optical drives such as DVDs and CDs, magnetic storage devices, such as hard drive discs, magnetic drives, magnetic tapes, memory cards, such as Compact Flash (CF), Secure Digital (SD) cards, Universal Serial Bus (USB) cards, and others.

Available storage provided by the node data storage 304 may be partitioned or otherwise designated by the storage controller, or otherwise, as providing for permanent storage and temporary storage. Non-transient data, transient data, computer instructions, or the like may be suitably stored in the node data storage 304 for any amount of time used to execute one or more computer instructions. While being used for execution of a computer instruction, such data is herein considered to be non-transient. While stored by the storage device, data is herein considered to be non-transient. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions and other data.

The node 102 may be any computing device capable of facilitating one or more of the operations described herein and/or otherwise provided by an implementation of the present disclosure.

Node Power Supply 306

The node 102 may be configured to include a node power supply 306. The node power supply 306 may include any known or later arising technologies which facilitate the storage, supplying, transforming, or other use of electrical energy. Non-limiting examples of such technologies include batteries, power converters, inductive charging components, transformers, line-power components, solar power components, and otherwise.

Node Security Component 308

The node 102 may be further configured to include a node security component 308. The node security component 308 may be provided as a hardware security component, a software executed security component, and/or a combination thereof. Security components are well known in the art and may include any known or later arising security hardware and/or software components, including computer instructions, or combinations thereof, that are configured to secure content, communications, restrict access to devices, processes, components, and data therewith, and otherwise. The node security component 308 may be used to facilitate secure transmission, processing, storage, and otherwise of any data used in accordance with an implementation of the present disclosure.

Node User Interface 310

The node 102 may be further configured to include a node user interface 310. The node user interface 310 may include any known or later arising human to device interface components, processes and technologies. User interfaces are well-known in the art and non-limiting examples include interfaces facilitating human to device communication of information in any form including include audible inputs (such as spoken commands) and outputs (generated sound), visible inputs (such as eye tracking and facial recognition) and outputs (such as visible images presented on a display device, LEDs, or otherwise), touch inputs (such as on a trackpad, touch screen or otherwise), touch feedback (such as vibrations or other movements), gesture tracking, and otherwise. The node user interface 310 may be coupled to and/or include the one or more presentation devices (not shown). The presentation devices facilitate interactions between a user thereof and the node 102. Non-limiting examples of presentation devices include speakers, displays, and others.

Node Communications Interface 312

The node 102 may be configured to include node communications interfaces 312. The node communications interfaces 312 may be configured to use any known or later arising communications and/or networking technologies which facilitate use of the network 106 and/or the network function virtualization infrastructure 110. Communication interfaces are well-known in the art and non-limiting examples include Ethernet cards, USB and storage medium interface cards, radio frequency transceivers, and others.

Network 106

As shown in FIG. 1 and for at least one implementation, the system 100 includes a network 106 that communicatively couples a node 102 with the VNO server 104 and communicatively couples the first node 102-1 with one more additional nodes 102-N.

For at least one implementation, nodes 102 may be directly or indirectly coupled. The network 106 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise.

The network 106 may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies.

One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, 5G, MPEG, and others.

As shown in FIG. 1, one or more communications links may be established between nodes 102, the VNO server 104, and the database(s) 108. It is to be appreciated that any combination of communications links may be combined or provided as single, multiple or other combinations of communication links. Accordingly, it is to be appreciated that the communications links are described herein for purposes of functional explanation and are not limited to any particular physical configurations.

A first node 102-1 may establish a first node link 112 with the VNO server 104. The first node link 102-1 may be used to facilitate communication of Needs and Solutions by and between the first node 102-1 and the VNO server 104.

A second node link 118-2/N may be established with the VNO server 104. The second node link 118-2/N may be used to facilitate communication of Needs and Solutions by and between one or more second nodes node 102-2/N and the VNO server 104. The second node link 118-2/N may be optional and may not be used in addition to the first node link 112. The first node link 112 is commonly used for an implementation of the present disclosure.

As further shown in FIG. 1, a first node 102 may establish a data link 120 with the one or more second nodes 102-2/N. The data link 120 may be used to facilitate communication of data between nodes over virtual network connections orchestrated by the VNO server 104 and by the network function virtualization infrastructure 110.

Database(s) 108

As shown in FIG. 1, the system 100 may include one or more databases 108. The databases 108 may be provided on the Cloud, one or more VNO servers 104, on one or more nodes 102, and/or otherwise. The databases 108 provide data storage of data and information relevant the processing of Needs and Solutions. Such data may be replicated, in whole or in part, on a server data storage 204, on a node data storage 304, or otherwise.

For at least one implementation, the database 108 may be utilized as a repository for "resource data" useful in monitoring network resources, including physical and/or virtual resources, tools available for managing such network resources, and other data. For at least one implementation, such resource data may be accessible by a VNO server 104, and more specifically, by an AIML engine 20B in identifying Solutions to Needs.

For at least one implementation, resource data stored by the database 108 or otherwise may be utilized to facilitate the arbitrage, trading, selling, leasing or otherwise of physical and/or virtual network resources. By analogy, resource data may be useful in leasing, selling or otherwise transacting with respect to, physical and/or virtual network resources in a manner similar to the trading of futures, calls, puts, or the like in commodities, such as corn, beef, pigs, steel, bit coins, currencies, or otherwise. Accordingly, and for at least one implementation, Solution data and Need data may be packaged by operators of VNO servers 104, nodes 104, or otherwise into tradable products on market exchanges, wherein the purchaser of such a package may acquire the right to use one or more network resources (physical or virtual), at one or more places and/or times, and while having one or more SLRs satisfied during such use of the network resource(s).

For at least one implementation, a Need may include any need for any data, product, service, or otherwise. For example, a Need may identify a need for use of a car service, an airplane trip, or otherwise. Accordingly, the Need engine 302A may be configured to identify such needs and acquire Solutions, from VNO server(s) 204 to such needs and from one or more providers thereof. A VNO server 104 may be configured to operate as a broker, intermediary, agent, or otherwise with respect to the providing of solutions to needs, where the solutions are provided by third parties and not by the VNO server 104.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. A system, for customer specific network slicing, comprising:
a Virtual Network Operator (VNO) server;
a first node; and
a virtualized network;
wherein the VNO server executes first computer instructions instantiating a solution manager engine which:
identifies a Solution;
communicates the Solution to the first node; and
upon acceptance of the Solution by the first node, instructs the virtualized network to couple the first node with a second node in accordance with the Solution;
wherein the Solution includes a slice of the virtualized network which satisfies a Service Level Requirement (SLR); and
wherein the SLR is determined based on a first application program the first Node is expected to later execute.

2. The system of claim 1,
wherein the virtualized network further comprises network function virtualization infrastructure.

3. The system of claim 1,
wherein the SLR specifies a maximum latency for the slice.

4. The system of claim 3,
wherein the SLR is specified in a Need received by the VNO server from the first node.

5. The system of claim 3,
wherein the SLR is further determined based upon a second application program the first Node is currently executing.

6. The system of claim 5,
wherein both the first application program and the second application program specifies at least one of a data processing requirement and a data communication requirement.

7. The system of claim 6,
wherein both the first application program and the second application program facilitates day trading.

8. The system of claim 6,
wherein both the first application program and the second application program facilitates real-time sports betting.

9. The system of claim 1,
wherein the VNO server executes second computer instructions instantiating an Artificial Intelligence/Machine Learning (AIML) engine which:
monitors the Solution;
monitors the first node for a requested Need; and
generates a future Solution to a future Need for the first application program.

10. The system of claim 9,
wherein the AIML engine identifies gaps in the virtualized network based upon of the Solution, a past Solution, a future Solution, the requested Need, a past Need, and the future Need.

11. The system of claim 1,
wherein the solution manager engine identifies the future Need based upon the first application program and a second application program the first Node is currently executing.

12. A node, for use with a customer specific network slicing system, comprising:
a central processing unit (CPU);
wherein the CPU executes computer instructions instantiating a need engine which:
generates a Need;
communicates the Need to a Virtual Network Operator (VNO) server;
receives a Solution to the Need from the VNO server; and
communicates at least one of an acceptance, a rejection, and a revised Solution to the VNO server;
wherein the Solution includes a slice of the virtualized network; and
wherein the SLR is determined based on a first application program the first Node is expected to later execute.

13. The node of claim 12,
wherein the Need identifies at least one Service Level Requirement (SLR) for a communicative coupling of the node with a second node over a virtualized network.

14. The node of claim 13,
wherein the Solution identifies whether the SLR identified in the Need can be satisfied by the slice of the virtualized network.

15. The node of claim 14,
wherein the SLR is a bandwidth requirement.

16. The node of claim 15,
wherein the bandwidth requirement arises with respect to a telemedicine application.

17. A method for allocating virtualized network resources comprising:
receiving, at a Virtual Network Operator (VNO) server and from a first node, a Need request;
determining whether the Need request can be satisfied by a present Solution;
if the Need request can be satisfied by the present Solution,
assigning the present Solution to the first node; and
communicatively coupling the first node with at least one second node using a slice of a virtualized network specified by the present Solution; and
if the Need request cannot be satisfied by the present Solution,
generating a new Solution;
wherein the Solution includes a slice of the virtualized network which satisfies a Service Level Requirement (SLR); and
wherein the SLR is determined based on a first application program the first Node is expected to later execute.

18. The method of claim 17,
wherein the Need request identifies the Service Level Requirement (SLR);
wherein the present Solution satisfies the SLR; and
wherein the new Solution identifies at least one alternative to the SLR.

19. The method of claim 18,
wherein the SLR specifies at least one of a maximum latency, a bandwidth, a security requirement, and a routing requirement.

\* \* \* \* \*